Oct. 17, 1939.     T. H. SCHOEPF ET AL     2,176,748
MAGNETIC TRACK BRAKE SYSTEM
Filed Feb. 17, 1936     3 Sheets-Sheet 1

INVENTORS
THEODORE H. SCHOEPF,
DAVID M. RITCHIE.
BY
ATTORNEYS

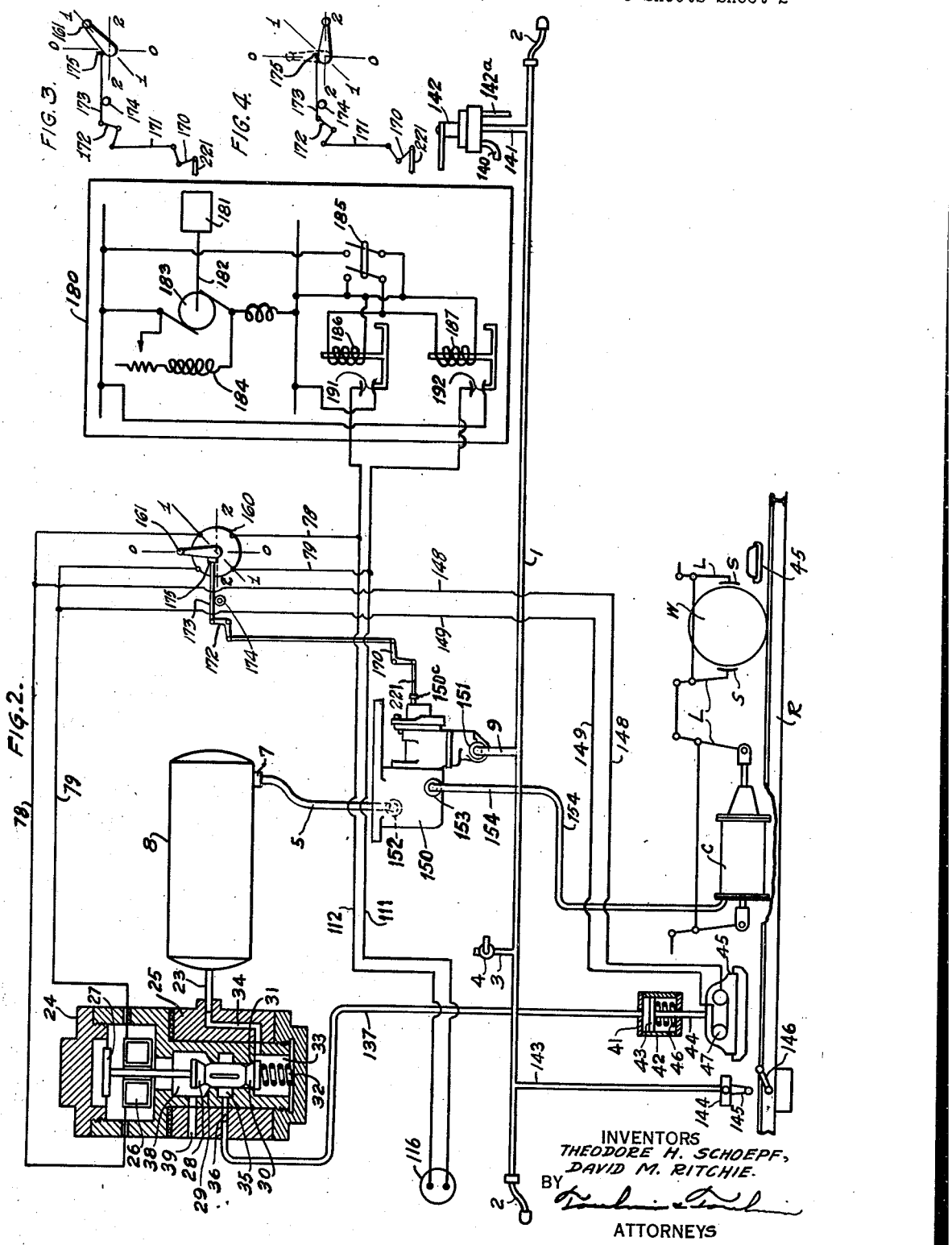

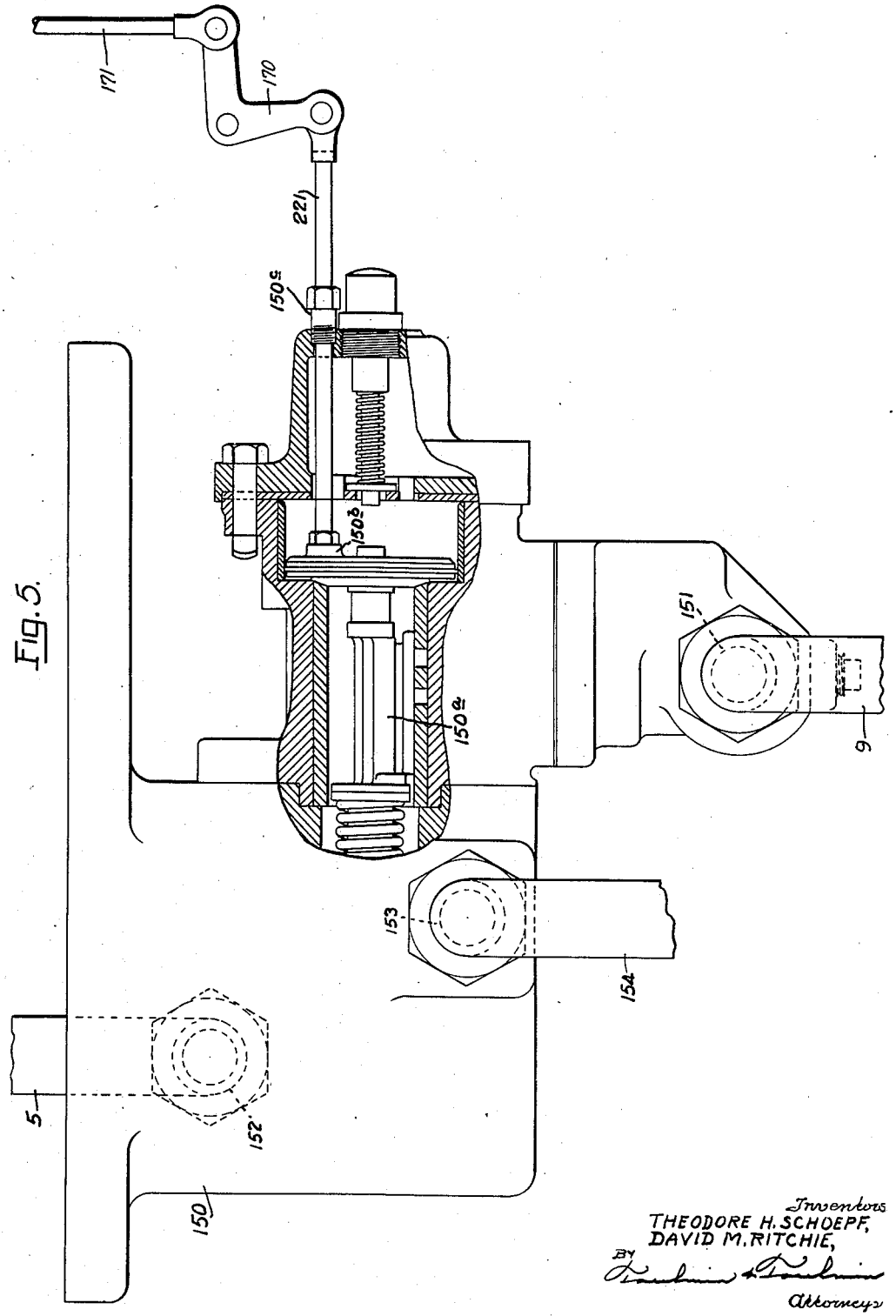

Patented Oct. 17, 1939

2,176,748

UNITED STATES PATENT OFFICE 2,176,748

MAGNETIC TRACK BRAKE SYSTEM

Theodore H. Schoepf and David M. Ritchie, Cincinnati, Ohio, assignors to The Cincinnati Traction Building Co., Cincinnati, Ohio, a corporation of Ohio Application February 17, 1936, Serial No. 64,297

26 Claims. (Cl. 303—3)

This invention relates to magnetic rail brakes for railway vehicles.

The general object of our invention is to combine with the usual air brake system operating upon the wheels of the vehicle, a magnetic track brake system having controlling means which is so arranged and disposed as to offer desired flexibility and selectivity in its application.

It is a further object of our invention to provide means whereby, upon application, either service or emergency, of the wheel air brakes, to cause the magnetic rail brakes to be automatically lowered into operative position and energized.

It is a further object of our invention to provide such means whereby the magnetic rail brake will be automatically lowered and energized, whether the application of the air brake be effected by actuation of the engineer's valve, conductor's emergency valve, track trip valve, by parting of the hose coupling between vehicles, or by any other means.

It is a further object of our invention to provide means whereby the electric power for energization of the track brake may be drawn from a source provided on each vehicle, or from a common source conveniently disposed on the train, of which the vehicle is a unit, and transmitted to all vehicles through an electric train line comprising wires and jumpers, or collected from trolley wires or third rails.

It is a further object of our invention to provide means comprising a suitable rheostat or resistance inserted in the brake-energizing circuit in order to adapt power of unsuitable voltage in a power source for use in the brake-energizing circuit.

It is a further object of our invention to provide means, whereby the magnetic track brakes on any vehicle may be applied by manipulating a single controller thereon to cause said magnetic track brakes to operate without application of the air brakes on the vehicle.

It is a further object of our invention to provide means associated with a controller, whereby the intensity of the magnetic brake energization, and the severity of the application thereof, may be regulated as desired, by manipulation of the controller.

It is a further object of our invention to provide such means whereby, by manipulation of the controller on any vehicle comprising a unit of a train, application of the magnetic track brakes on all of the units in the train may be accomplished, and regulation of the severity of the application thereof may be accomplished.

It is a further object of our invention to provide, in addition to the common source of electrical power, an auxiliary source of power on each vehicle in a train and means to connect each source of electrical power to the first-named common source when the magnetic track brakes are applied as a result of applying the air brakes, or through the manipulation of a controller in the manner stated above.

It is a further object of our invention to provide in the combination of an air brake system and magnetic track brake system, these and other means for providing flexibility of control and combinations of functions of the respective brake systems and means for causing the respective functions to be performed.

These and other advantages will appear from the description taken in connection with the drawings which are illustrative only and in no wise limiting.

Referring to the drawings:

Figure 2 is a diagrammatic view of additional structure, by which our invention may be practiced;

Figure 3 is a diagrammatic view of means utilized for synchronizing the air brake valve and solenoid and brake magnet energizing circuit switch for one mode of operation, according to our invention;

Figure 4 is a diagrammatic view of like structure utilized for the synchronization of the valve and switch for a second mode of operation, according to our invention;

Figure 5 is a detail view of the "triple valve" shown in Figure 2, as modified by us in the practice of our invention, with the connections thereof broken away.

Figure 1:
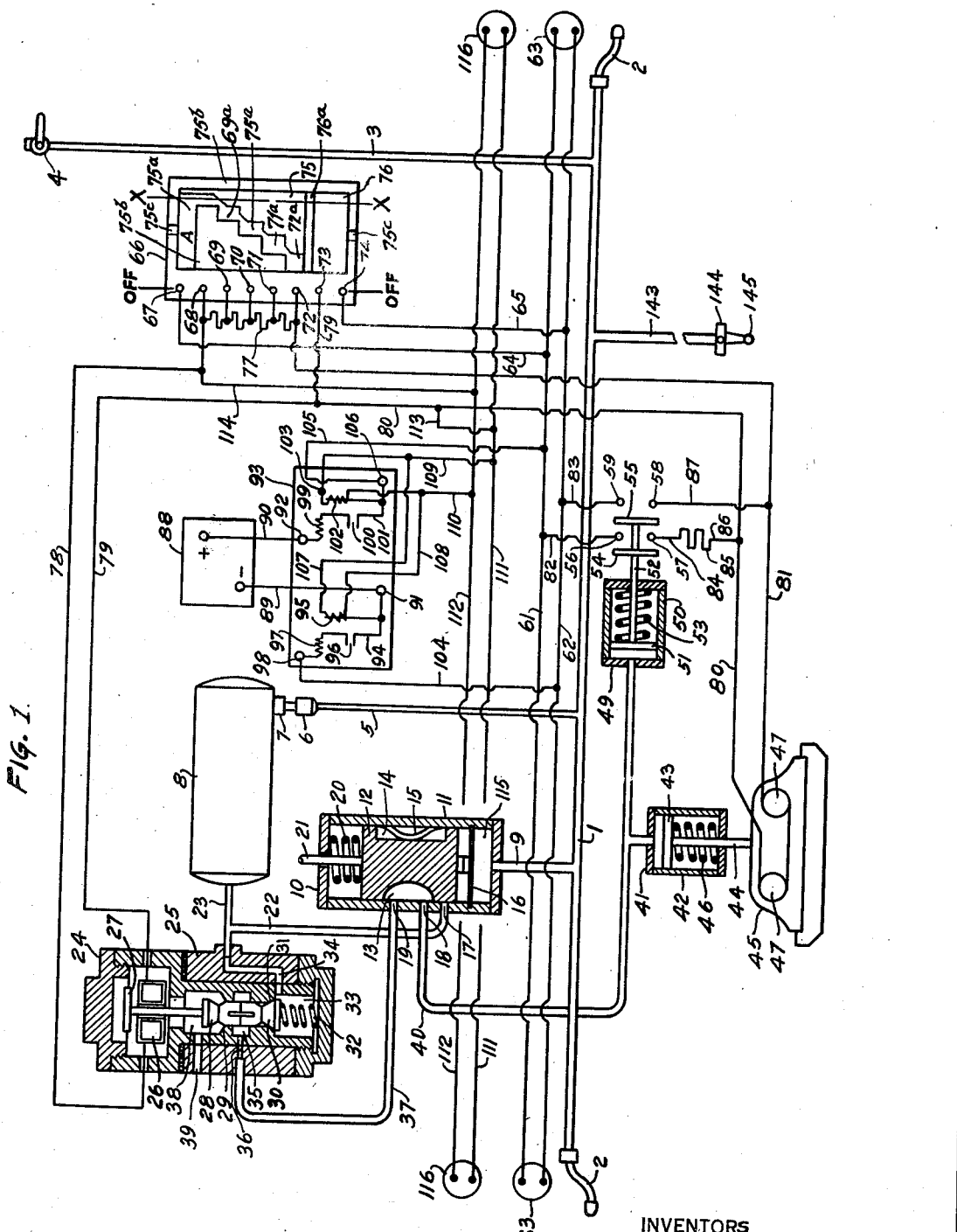
Figure 1 is a diagrammatic view of structure utilized for the practice of our invention.

According to our invention, the application of the magnetic track brake may be selectively effected in the following manners:

I. Upon application, either service or emergency, of the air brakes which operate upon the wheels of the vehicle, the magnetic rail brake is automatically lowered and energized. The application of the air brake may be effected either by actuation of the engineer's valve, by actuation of the conductor's emergency valve, by the operation of the track trip valve, by the parting of a hose coupling between vehicles in a train, or in any known manner. The electrical power to energize the track brake may be drawn from a source provided on each vehicle or from a common source conveniently disposed on the train and transmitted from vehicle to vehicle to the train by means of an electric train line comprising suitable wires in the vehicles and jumpers interposed therebetween, or the power may be collected from trolley wires or third rails. When the voltage of the power supply or source is unsuited to the track brake system, a suitable rheostat or resistance may be introduced into the energizing circuit to adapt the supplied power for use in the magnetic brake-energizing circuit.

II. In addition to the above described manners of operation, a controller and associated devices and means may be provided, whereby the magnetic track brakes may be applied on any vehicle as desired by manipulation of the controller thereon, without the application of the magnetic track brakes on any other vehicle in the train. The controller may have further associated therewith a rheostat, connected in the energizing circuit and having suitable connection to the controller, whereby the intensity of the brake energization may be regulated, in order to regulate the severity of the application of the magnetic brakes to the track.

III. In addition to the manners of operation, described above in I and II, a second electrical train line and associated jumpers are provided and connected by circuits with the controller and associated devices and means in such a manner that manipulation of the controller on any vehicle in the train will apply the magnetic track brakes on all of the vehicles in the train and regulate the severity of the application thereof to the track rails.

IV. In addition to the manners of operation, described above in I, II and III, and particularly applicable to trains wherein each vehicle is equipped with a separate or auxiliary source of electrical power, as well as the common source, means may be provided to connect all sources of electrical power to the first-named source of electrical power or electrical train line, when the magnetic track brakes are applied as a result of the application of the air brakes or through the manipulation of the controller, as described above.

*Pneumatic devices and connections*

Referring particularly to Figure 1, the air brake train line or pipe, indicated at 1, has conventional hose couplings 2 at either end thereof, by which the respective train lines may be connected in series, when the vehicles supporting them are connected in a train. Leading from the train line 1 is a branch pipe line 3 having thereon the conductor's emergency valve 4. The branch pipe line 3 will be referred to as the first branch pipe line or conductor's emergency branch pipe line. Also leading from the train line 1 is a second branch pipe line 5 leading to the single acting check valve 6 which is connected by a short pipe and nipple 7 to the air reservoir 8. The branch pipe line 5 will be hereinafter referred to as the second branch pipe line. Also leading from the air brake train line 1 is a third branch pipe line 9, which connects the train line 1 with a slide valve, generally designated 10. The branch pipe line 9 will be hereinafter referred to as the third branch pipe line or slide valve branch pipe line. The slide valve 10 has a body 11, a slide 12 with a chamber 13, and a recess 14 having therein a spring 15, which functions to press the slide 12 firmly on its seat.

Within the valve 10 is a diaphragm 16 and ports 17, 18 and 19. Disposed at one end of the valve slide 12 is a guide or tail rod 21 and disposed about this guide, having one end in abutment with a valve end wall and the other end in abutment with the end wall of a valve slide 12, is a spring 20, which serves to urge the valve slide in one direction in the valve. The diaphragm 16 cooperates with another end wall of the valve to define the air or pressure chamber 115 which is connected by means of branch pipe line 9 directly to the train line 1. Leading from the port 17 to a pipe line 23, connecting the air reservoir with a valve device, hereinafter described, is the pipe line 22. Leading from the port 18 of the valve 10 is a pipe line 40, which leads to a pair of air engines, which will be hereinafter described. Leading from the port 19 of the vave 10 is a pipe line 37, which is connected to the valve device 24, which will be hereinafter described. The valve device 24 may be generally described as a solenoid actuated or electro-responsive valve which may be suitably operated by electrical means to connect and disconnect the pipe 37 with the connector pipe 23, which leads from the air reservoir 8. Suitably connected to the pipe line 40 is an air engine 41, which may be referred to as the brake-actuating air engine. The air engine 41 comprises a cylinder 42 having therein a piston 43 attached to one end of a piston rod 44, which has a track brake 45 mounted on the other end thereof. Disposed within the cylinder 42 about the piston rod 44 is a spring 46 adapted to urge the piston 43 upwardly within the cylinder and to likewise urge the track brake 45 upwardly. The track brake 45 is equipped with suitable magnets 47, which are adapted to be energized by wires 80 and 81.

Also connected to the pipe line 40 is an air engine, generally designated 49, which may be referred to as the circuit closing air engine. This circuit closing device comprises a cylinder 50 having therein a piston 51, which is attached to a piston rod 52 having at the other end thereof switch disks, blades or bridging pieces 54 and 55. Disposed within the cylinder about the piston rod 52 is a spring 53 which is adapted to urge the piston and the switch blades 54, 55 toward the left, as shown in Figure 1.

*Electro-pneumatic valve device (Fig. 1)*

The electro-pneumatic valve device or electro-responsive valve which may be also described as an electrically operated valve, is generally designated 24, and comprises a body 25, having a solenoid 26 therein, adapted to cooperate with the armature and stem 27, which has fixed at the lower end thereof a pair of feathered valves 28 and 30, which are adapted, upon reciprocation of the armature and stem 27, to be seated on seats 29 and 31, respectively. The body portions of the valves 28 and 30 are adapted to slide in a centrally arranged bore in the valve body, which bore terminates in the upper air chamber at one end and the lower air chamber 33 at the other end and which bore has a central air chamber 35 at the middle portion thereof. Disposed within the air chamber 33 is a spring 32 which is adapted to normally seat the valve 30 on its seat 31 and which is adapted to be overbalanced by the action of the solenoid 26 when energized, at which time it thrusts the armature and stem 27 downwardly against the spring 32, unseating valve 30 and seating valve 28 on its seat 29. The air chamber 33 communicates with the connector pipe 23, which leads to the air reservoir 8. The central air chamber 35 communicates with air passage 36, which is in turn connected by pipe line 37 to the port 19 of the valve 10. The upper air chamber 38 communicates with the atmosphere through passage 39 in the valve body. The solenoid 26 is adapted to be energized by completion of circuits, of which the wires 78 and 79 are branches and which circuits will be hereinafter described in detail. As shown in Figure 1, the above-described parts are in their normal state, wherein the air brakes and magnetic track brakes are released and ready to be applied upon proper manipulation of the several control devices.

*Operation of pneumatic devices and connections*

In the position of parts shown in Figure 1, the air train line 1, branch pipe lines 3, 5 and 9, pipe and nipple 7, air reservoir 8, connector pipe 23, pipe 22, passageway 34 and chamber 33 of device 24, as well as chamber 115 of the slide valve 10, are all filled with air under pressure; all other pipe lines, chambers, and passages are evacuated to atmosphere.

A material reduction in the pressure of air in the train line 1, which may be effected in any known manner, results in a corresponding reduction of pressure in pipe 9 and corresponding chamber 115 of valve 10, whereupon spring 20 overpowers the diaphragm 16, due to the reduced air pressure in chamber 115, thus moving the slide 12 to a newer position or downwardly from that shown in Figure 1. In the described position, the port 19 will be closed by the valve slide 12 of valve 10, and the chamber 13 of the slide 12 will then connect ports 17 and 18 for communication with one another through chamber 13. Air under pressure will then flow from reservoir 8 through connector pipe 23 into pipe 22 through chamber 13 and into pipe line 40, by which it is conveyed to the upper side of the piston 43 in the brake-actuating air engine 41 and to the lefthand side of piston 51 (as seen in Figure 1) of the switch-actuating air engine 49. The check valve 6 prevents air from escaping from air reservoir 8 through pipe and nipple 7 into branch pipe 5. The pressure applied through pipe 40 to piston 43 overpowers the spring 46 and forces the piston 43, piston rod 44 and track brake 45 downwardly toward the track rail. At the same time the application to piston 51 in cylinder 50 of air engine 49 overpowers spring 53 and thrusts the piston rod 52 and its attached switch blades 54 and 55 toward the right, as seen in Figure 1. These switch blades, by bridging respectively contacts 56, 57 and 58, 59, complete the energizing circuit for the magnets 47 of the track brake 45, as will be hereinafter described.

It is thus seen that reduction in the air pressure in air brake train line 1 results in the introduction of air pressure into pipe line 40, whereby to actuate air engine 41 to lower the track brake 45 and air engine 49 to complete the energizing circuit for the magnets 47 of the brake 45. Likewise, with the parts in the position shown in Figure 1, if the solenoid 26 of the electro-pneumatic valve device 24 be energized, the armature and stem 27 therein, will be thrust downwardly against the pressure of spring 32, whereby to unseat valve 30 and seat valve 28 on its seat 29. Air from air reservoir 8 may then travel through passage 34 into lower air chamber 33 and thence through the valve bore into central air chamber 35 and then through passage 36 into pipe line 37, by which it is conducted through port 19 of the valve 10 into chamber 13 of the valve slide 12, which, in the position of the parts as shown in Figure 1, communicates with the pipe line 40, whereby pressure from the air reservoir 8, upon energization of the solenoid 26 of the device 24, is introduced to pipe line 40 for the purpose of operating the track brake air engine 41 and the circuit-closing air engine 49 in the manner described above, in order to lower and energize the track brake 45.

Reduction in the pressure in the air brake train line 1 may be further accomplished by disconnecting either of couplings 2 or by operation of the conductor's emergency valve 4, whereby to bleed the train line 1 through the first branch pipe line 3.

*Electrical devices, means and circuits*

The first-named or main electrical train line comprises wires 61 and 62, preferably extending the length of the vehicle and terminating in receptacles 63. The receptacles 63 are adapted to be connected by suitable jumper means to corresponding receptacles on adjoining vehicles in the train. A branch circuit comprising wire 64 attached to wire 61 and wire 65 attached to wire 62 of the train line connects the train line to contacts 67 and 74 respectively of a controller, generally designated 66.

The controller 66 has stationary contacts 67, 68, 69, 70, 71, 72, 73 and 74. The controller also has a rotor composed of segments 75 and 76 which are electrically insulated from one another by the interposed segment 76a of insulating material. The rotor is provided with axles 75c for rotatable support thereof in a suitable controller casing. The segment 76 is provided with a coextensive conducting surface. The segment 75 is provided with a conducting surface portion 75a of irregular outline which is surrounded by non-conducting surfaces 75b. The conducting surface portion 75a is divided into a relatively large contact member A and a plurality of smaller contact members 69a, 70a, 71a and 72a extending in staggered relation from the member A and electrically connected thereto. Any suitable manual handle or other desired control means may be provided for rotatable adjustment of the rotor of the controller 66. The wire 64 of the branch circuit connects wire 61 of the electrical train line to contact 67, while the wire 65 of the branch circuit connects wire 62 of the electrical train line to contact 74. A rheostat, generally designated 77, is connected by suitable taps or lead wires to the contacts 68, 69, 70, 71 and 72 in a known manner, whereby rotation of the segment 75 may effect adjustment of the resistance included in an electrical circuit, as hereinafter more clearly described. The contact 68 is connected by a wire 78 to one terminal of the solenoid 26, which is described above, and the other terminal of the solenoid 26 is connected by the wire 79 to the contact 73. A wire 80 connects the wire 79 and contact 73 to one terminal of the coils of magnets 47 of the track brake 45, and the other terminal of the track brake magnet coil is connected by wire 81 with contact 72. A circuit may thus be traced from contact 68 through wire 78 to solenoid 26 and thence back through wire 79 to contact 73, and another circuit may be traced from contact 73 through a branch wire 79 through wire 80 to the coils of 47 and thence back through wire 81 to contact 72. Two wires 82 and 83 are connected at one end to wires 61 and 62 respectively of the electrical train line. The wire 82 connects the wire 61 to a contact 56, while the wire 83 connects the wire 62 to a contact 59. Opposite the contact 56 is a contact 57, which is connected by wire 84 with resistance 85 which, in turn, is connected by wire 86 to the wire 80 of the brake-energizing circuit. Opposite the terminal 59 is a terminal 58, which is connected by means of wire 87 to the wire 81 of the brake-magnetizing circuit. The bridging contacts or switch blades 54 and 55, above described, are adapted respectively to bridge the contacts 56, 57 and 58, 59 in order to complete the brake-energizing circuit from the electrical train line when air pressure is introduced in pipe line 40, as described above.

When the switch blades or members 54 and 55 are in abutment with the respective contacts, the path of the circuit is from wire 61 through wire 82 to contact 56 through switch blade 54 to contact 57 through wire 84, coil 85, wire 86, wire 80, the coils of the brake magnet, and thence through wire 81, wire 87, contact 58, switch blade 55, contact 59, and wire 83, to wire 62 of the electrical train line. It will thus be seen that the brake coils are energized when a circuit is completed between contacts 72 and 73 on the one hand or when, in the operation of the switch engine 49 described above, the circuit is completed between contacts 56 and 57 by switch blade 54, and between contacts 58 and 59 by switch blade 55.

*Brake operation through controller (Fig. 1)*

The operation for lowering and energizing the magnetic brake on any vehicle is as follows. The segments 75 and 76 of the controller are moved to the left, as, for instance, until the line X—X coincides with the line of contacts marked "Off", thus completing an electrical circuit from train line wire 62, through wire 65 to contact 74 through segment 76 to contact 73 through wire 79 to solenoid 26, thence by wire 78 to contact 68, through portion A of segment 75, contact 67, and wire 64 to wire 61 of the electrical train line. The energization of the solenoid 26 thrusts downwardly the armature and stem 27, which seats valve 28 on seat 29, whereby to admit air under pressure from air reservoir 8 through connector pipe 23, passage 34, air chamber 33, central air chamber 35, passageway 36, pipe line 37 and port 19 to chamber 13 of the valve slide 12, whereby to introduce air pressure in the pipe line 40 and thus cause operation of the air engine 41 to depress the track brake and to also cause operation of the switch air engine 49 to complete the circuit from wire 61 of the electrical train line through wire 82, contact 56, switch blade 54, contact 57, wire 84, resistance 85, wire 86, wire 80, brake coils, wire 81, wire 87, contact 58, switch blade 55, contact 59, and wire 83 to wire 62 of the electrical train line for the purpose of energizing the magnetic brake. When the controller 66 is thereafter brought to "off" position, the solenoid coil 26 of the electropneumatic valve device 24 is de-energized and air escapes from pipe line 40, through port 13, through pipe 37 and thence through the passage 39 of the de-energized electropneumatic valve to the atmosphere. This removes the switch blade 54 from contacts 56 and 57, and the switch blade 55 from contacts 58 and 59, thus opening the circuit therethrough. Pressure is simultaneously removed from cylinder 42, whereby to release the brake shoe from rail engaging position.

During automatic application and energization of the contact brakes by decrease of pressure in the air line 1, through operation of valve 11, the switch blade 54 connects contacts 56 and 57, and the switch blade 55 connects contacts 58 and 59. The resistance 85 is then in series with the resistance of the brake coils in the closed brake energizing circuit. The resistance 85 is of fixed value.

When, by operation of controller 66, the electropneumatic valve 24 is energized, the switch blades 54 and 55 again close the energizing circuit, in which the resistance 85 is in series with the resistance of the brake coil. By suitable operation of the controller 66, as hereinafter described, a secondary energizing circuit may be completed, which is in parallel with the above-described energizing circuit. Variable resistances may be inserted in the secondary energizing circuit, which resistances are in parallel with the fixed resistance in the complete circuit comprising the primary and secondary circuits.

When the controller is in the position illustrated in Figure 1, the brake energizing circuit is open, as is also the energizing circuit for the coil 26 of the electropneumatic valve device 24. Upon rotating the rotatable segments 75 and 76 to the left, as seen in Figure 1, first contact thereof with contacts 67 and 68 will be such that the circuit is completed between contacts 67 and 68 through the conducting portion A of the segment 75. Simultaneously, a circuit is completed between contacts 73 and 74 by the conducting surface of the segment 76.

Due to the configuration of the conducting portion A of the segment 75 and the configuration of the surface 76, as illustrated in Figure 1, these circuits will be completed (between contacts 67 and 68 through portion A of segment 75, and between contacts 73 and 74 through segment 76), whenever the controller is in any operative position, namely, between its initial operating position when the above circuits are closed and the circuit between contacts 67 and 68 is open and in its extreme position when the line X—X is in the position of the line Off-Off in Figure 1.

When the circuit is closed between contacts 67 and 68 and the circuit is closed between contacts 74 and 73, the energizing circuit for the coil 26 for the electropneumatic valve device is closed. The circuit for energizing the coil 26 is as follows: wire 61, wire 64, contact 67, through segment 75 to contact 68, wire 78 to coil 26, coil 26 through wire 79, contact 73, through segment 76, contact 74, wire 65 to wire 62. Wires 61 and 62 are normally "alive", being electrical train line wires.

When the controller 66 is placed in the above position, the electropneumatic valve device 24 is energized to position the brake shoe by means of cylinder 42 and associated parts, while simultaneously, by means of cylinder 50 and associated switch means, completing the circuits from contact 56 to contact 57 through switch blade 54, and from contact 58 to contact 59 through switch blade 55. The brake is thus energized to the same degree as during automatic operation, due to the fact that the fixed resistance 85 is in series with the resistance of the brake coils in the energizing circuit.

In order to vary the degree of energization of the brakes, means is provided for adding resistance to the brake energizing circuit by the manipulation of the controller 66. This means comprises the tapped resistance or rheostat 77, the contacts 68 to 72 and the contacts 69a, 70a, 71a and 72a which are disposed on the segment 75 in staggered relation to the portion A and electrically connected thereto.

When the controller is placed in the initial operative position, the contact member 72a engages the contact 72 to close the circuit from wire 78 through contact 68, through contact members A, 69a, 70a, 71a and 72a, to contact 72, to wire 81. The tapped resistance or rheostat 77 is wholly excluded from the circuit between wire 78 (and thus wire 80) and wire 81.

In the next operative position of the controller, the contact 71a is engaged with the contact 71 to complete the circuit between wire 78 through contact 68, through contact members A, 69a, 70a and 71a to contact 71 through one-fourth of the resistance 77 to wire 81. In this position of the controller, one-fourth of the resistance 77 is inserted in the secondary brake coil energizing circuit, which circuit is parallel to the primary brake coil energizing circuit. The added resistance is, therefore, placed in parallel with the fixed resistance 85 due to the parallel disposition of the primary and secondary brake coil energizing circuits.

In the next operative position of the controller 66, the contact 70a is brought into engagement with the contact 70, to complete the circuit from wire 78 through contact 68, contact members A, 69a and 70a, contact 70 and one-half of the resistance 77 to wire 81.

In the next operative position of the controller, the contact member 69a is brought into engagement with contact 69 to complete the circuit between wire 78 through contact members A, 69a, contact 69 and three-fourths of resistance 77 to wire 81.

In each of these positions, the circuits between contacts 67 and 68, and between 74 and 73 are closed to complete the energizing circuit for the coil 26 of the electropneumatic valve device 24.

In the initial operative position of the controller, when contact member 72a engages contact 72, the circuit between wires 78 and 81 is closed with addition of no resistance. In the second operative position, one-fourth of the resistance 77 is inserted in the secondary brake coil energizing circuit, while in the third and fourth operative positions, one-half and three-fourths respectively of the resistance are inserted in the completed secondary brake coil energizing circuit between wires 78 and 81.

In the extreme position of the controller, where the line X—X (Figure 1) coincides with the line Off—Off, the circuit between wires 78 and 81 includes the entire resistance 77. It is, of course, to be understood that a greater number of taps may be provided for the resistance 77 and a like greater number of contact members provided in staggered relation to the portion A of the segment 75. It is likewise to be understood that the value of the resistance 77 may be varied as is found desirable and that the division thereof by tapping need not be uniform.

The above-described circuit is, as stated, the secondary brake energizing circuit and extends from wire 81 to the brake coils, from the brake coils through wire 80 to wire 79 through coil 26, through wire 78, to contact 68. This secondary circuit is in parallel with the primary circuit which is closed by switch blades 54 and 55 upon energization of the solenoid coil 26 when the controller is in any operative position. Thus, the addition of portions of the resistance 77 in the secondary brake energizing circuit will vary the intensity of energization of the brake coils, because this added portion of the resistance 77 will be placed in parallel with the fixed resistance 85 in the primary energizing circuit due to the parallel disposition of the secondary brake coil energizing circuit with respect to the primary brake coil energizing circuit.

As shown particularly in Figure 1, a local or secondary source of electrical power, which may comprise a storage battery, a generator or the like, generally indicated 88, is connected by means of wires 89 and 90 to contacts 91 and 92 respectively, of a switch device, generally indicated as 93. The switch device comprises two solenoid-actuated contactors. One contactor comprises the movable arm 94, solenoid 95, butt contacts 96, blow-out coil 97 and terminal 98. The second contactor comprises a terminal 92, blow-out coil 99, butt contacts 100, solenoid 102, movable arm 101, and terminals 103 and 106. Wire 104 connects the terminal 98 with train line wire 62 and wire 105 connects the terminal 106 with the train line wire 61. The solenoids 95 and 102 are connected in parallel or multiple relationship by wires 107 and 108, which are connected in turn by wires 109 and 110 to two wires 111 and 112 respectively comprising a second, auxiliary or secondary electrical train line. The second pair of electrical train line wires 111 and 112 is connected by the wires 113 and 114 to the wires 80 and 78 respectively. The ends of the wires 111 and 112, which comprise the second or auxiliary electrical train line, are suitably attached to receptacles 116 disposed at the ends of the vehicle, which receptacles are adapted to be connected by suitable jumper means, not shown, to corresponding receptacles of adjacent cars in the train.

*Connection and operation of electrical train line (Fig. 1)*

The secondary train line comprises wires 111 and 112 and receptacles 116, described above. The wire 113 connects the wire 111 to the wire 80, as described above, while the wire 114 connects the wire 112 with the wire 78, as described above. Normally the wires 111 and 112 are "dead" or unconnected to any source of power.

Upon manipulation of the controller 66 on any one vehicle in the train to establish contacts between segments 75 and 76 and contacts 67 and 74 inclusive, the magnetic track brake on each and every vehicle on the train is lowered and energized. The wires 61 and 62 are connected to a common source of electrical power and are "alive" at all times save in case of failure of the power supply thereof or disconnection of the particular vehicle from a train containing a power source connected thereto, as hereinbefore described, and, when the controller 66 is manipulated, as described in the preceding paragraph, two circuits are completed. One circuit extends from wire 61, through wire 64, contact 67, segment 75, contact 68, wire 78, solenoid 26, wire 79, contact 73, segment 76, contact 74, and wire 65 to wire 62, which lowers the brake 45 on that particular vehicle and energizes it, as above described. The other circuit extends from wire 78 through wire 114 to train line wire 112 and from wire 79 to wire 80, wire 113, to the train line wire 111. This circuit connects the first or primary train line comprising wires 61 and 62 to the second train line comprising wires 111 and 112, whereby the second train line then becomes "alive".

Upon the connection of the second or auxiliary electrical train line comprising wires 111 and 112 with the first or primary electrical train line comprising wires 61 and 62, a circuit is established on each of the other vehicles comprising the train, whereby the magnetic track brakes are applied through energization of the solenoid 26 in that vehicle. The circuit begins at train line wire 111 and extends through wire 113, wire 80, wire 79, to solenoid 26, from solenoid 26 to wire 78, and through wire 114 to train line wire 112. The solenoid 26 is thus energized and actuates the electro-pneumatic device 24 to connect the connecting pipe 23 in circuit with pipe line 37, whereby to introduce air pressure in the pipe line 40, as above described. The wires 111 and 112 which are adapted for connection with corresponding wires in other vehicles, thus form, with the connected wires, a control train line which may be energized by operation of the controller on any vehicle to connect the wires 111 and 112 of that vehicle to the energized train line wires 61 and 62 which are connected to a train source of power.

There is furthermore encountered a condition where each vehicle is equipped with a local source of electrical power as well as a common source for all vehicles in the train and a means to automatically connect all the sources to the first-named common source upon application through actuation of the controller of the magnetic track brakes whereby the local source may aid the common source in handling the added load due to the application of the brakes. Likewise, upon the occurrence of failure of the common source, the local sources may temporarily carry the load normally carried by the common source. Furthermore, when the single units are separately operated, the local sources provide means for operation of the brakes because the common train lines comprising wires 61 and 62 would be dead. This means comprises the local source of electrical power and the switch device, generally designated 93, and includes a pair of solenoid actuated contactors, described above. The operation of this mechanism is as follows. The local source of electrical power 88 is connected through wires 89 and 90, switch device 93 and wires 104 and 105 to train line wires 61 and 62 respectively. The switches are solenoid actuated and the solenoids thereof are actuated through the circuits comprising wire 111, wire 109, solenoid 102, wire 110 to wire 112, and secondly from wire 111 through wire 109, wire 107, solenoid 95, wire 108 and wire 110 to wire 112 of the auxiliary electrical train line. The solenoids 95 and 102, which are thus energized upon each energization of wires 111 and 112, actuate the movable arms 94 and 101, whereby to close the respective butt contacts 96 and 100, thus completing the circuit from source 88 through wire 89, terminal 91, arm 94, butt contacts 96, blow-out coil 97, terminal 98 and wire 104 to primary electrical train line wire 62, and from train line wire 61 through wire 105, terminal 106, arm 101, butt contacts 100, blow-out coil 99, terminal 92 and wire 90 to a terminal of power source 88. Upon failure of the main source of electrical power, the main train line wires 61 and 62 will be energized by the local source 88, provided, of course, that wires 111 and 112 have been first energized before the failure, through connection with wires 61 and 62 by actuation of the controller. It is thus clear that, upon energization of the wires 111 and 112, the contactor switches connect the local source 88 across the wires 111 and 112 to produce a boosting effect and that, after the connection of the sources 88 across wires 111 and 112, failure of the train source of power will be prevented from de-energizing the wires 61 and 62 because of the connection of these wires, through the controller, to wires 111 and 112, across which are then connected the local sources 88. It is thus to be noted that the wires 111 and 112, when connected to corresponding wires of other connected cars or vehicles, form a main electric train line which is connected to a main, common, or train source of power and that, when all controllers are open, as shown in Figure 1, the wires 111 and 112 are dead. Whenever, the controller is closed, the contacts 73 and 74 thereof will be connected to complete a circuit from wires 62 of a car (energized by the common or train source of power) through wire 65, contacts 74, 76, 73, wires 79, 80, 113, to normally dead wire 111. This connects a wire 111 with an energized wire 62.

The contact 67 (which is connected by wire 64 to wire 61) will also be connected by the controller (either contacts 69, 70, 71 or 72 or directly through contact 68, in which latter case the ultimate energization is provided) to the wire 114. This connects the energized wire 61 to wire 112 and the circuit in the vehicle having the controller closed extends from wire 61 through wire 64, contact 67, through the controller to wire 114 and thus to wire 112. This energizes wires 111 and 112 of the vehicle by connection thereof with the energized wires 61 and 62 having electrical connection with the train source of power. The wires 111 and 112 of each vehicle are connected to form an auxiliary or control train line. Upon energization of the wires 111 and 112 of one car, therefore, all wires 111 and all wires 112 will be energized.

Upon energization of the auxiliary or control train line comprising connected wires 111 and connected wires 112, the contactors on each vehicle will connect the local source 88 thereof across the wires 111 and 112 thereof to produce a boosting effect. During this boosting, the local sources 88 are, in effect, connected in parallel with the main or train source of power. The adjustment of the closed controller determines the amount of resistance inserted in the track brake coil energizing circuit and thus determines the intensity of energization thereof. The closing of the controller on one vehicle will cause energization of the solenoids 26 of each electropneumatic valve 24 by completion, in each car, of a circuit which extends from wire 111 to wire 113, wire 80, wire 79, solenoid 26, wire 78 to wire 114 and thence to wire 112. Thus upon closing of any controller, the wires 111 and 112 are energized and this energization causes the local source 88 of each vehicle to be connected as a booster across the control train line comprising wires 111 and 112, while, at the same time, the electropneumatic valve devices 24 of each vehicle are energized to cause brake application. A failure of the main or train source of power, after energization of the auxiliary or control train lines comprising connected wires 111 and connected wires 112, will be prevented from causing failure of the track brakes because the wires 111 and 112, which are energized by the local sources 88, are connected to the wires 61 and 62.

*Operation when magnetic track brakes are applied through application of air brakes and no controller is manipulated. (Fig. 1)*

In this case, the circuit-closing air engine is actuated in the manner previously described and a circuit is established from train line wire 61 through wire 82, terminal 56, switch blade 54, terminal 57, wire 84, resistance 85, wire 86, wire 80, and wire 113 to train line wire 111, and from train line wire 112 through wire 114, wire 78, resistance 77, wire 81, wire 87, terminal 58, switch blade 55, terminal 59 and wire 83 to train line wire 62. When the auxiliary electrical train line wires 111 and 112 are so connected, the switch device 93 is actuated to connect the source 88 to train line wires 61 and 62, as previously described.

Figures 2 to 6 inclusive and 8 illustrate the second embodiment of our invention, wherein the conventional "triple valve" is utilized to control the energization and application of the magnetic brakes to the track rails, the "triple valve" being modified by the attachment of the guide 221 to the main piston of the main slide member 150a thereof, as shown in Figure 8. As shown particularly in Figure 2, a suitable air supply 140 may be connected by manipulation of the motorman's valve 142 through the branch pipe line 141 to the air brake train line 1. There is also therein illustrated one means for causing operation of the circuit switch for energization of the solenoid and brake magnets by movement of the slide of the "triple valve" 150 for the purpose of controlling the air brakes when the "triple valve" is operated, either by reduction of pressure in the air brake train line 1 or by manual means.

As shown in Figure 2, the pneumatic devices and connections are broadly similar to those of Figure 1, described above. The air train line 1 has a branch pipe line 3 extending therefrom, which branch pipe line terminates in the conductor's emergency valve 4; also leading from the air brake train line is the branch pipe line 9, designated the third branch pipe line in the above description of Figure 1. The above described second branch pipe line has been omitted because of the insertion of the "triple valve" 150 between the branch pipe line 9, branch pipe line 5 and pipe line 154. Also leading from the air brake train line 1 is the branch pipe line 141, to which is attached the motorman's valve 142, which valve is provided with an air supply connection 140 and an exhaust line connection 142a. A further branch pipe line 143 leads from the line 1 to the safety valve 144, which has an arm 145 adapted to be tripped or operated by the track switch 146. The "triple valve" 150 is of conventional construction, but is modified for the purpose of this invention by the rigid attachment of the guide member 221 at 150b to the main piston of the main slide member 150a thereof, as shown in Figure 8.

The fluid seal member 150c is disposed about the guide member 221. The member 150c is screw threaded into the wall of the body of the triple valve 150 in order to prevent the escape of fluid from the interior of the valve 150 along the guide 221 (Figure 8). The "triple valve" 150 has a port 151 connected to the branch pipe 9 which leads thereto from the train line 1. The valve 150 has also a port 152 which is connected to the pipe line 5 which communicates through the nipple 7 with the air reservoir 8. The check valve 6 of Figure 1 has been omitted for reasons which will further appear. The valve 150 also has a port 153 which is connected by means of the pipe 154 to the air brake operating cylinders C. The valve 150 (Figure 8) contains a conventional triple valve slide therein, the main slide member 150a of which slide has a guide 221 rigidly attached to the main piston thereof to provide means for manually moving the slide. In the position shown in Figure 2, the valve slide prevents communication of branch pipe line 5 with branch pipe line 154.

The electro-pneumatic valve device or electro-responsive valve 24 of Figure 2 is identical with that of Figure 1 and described above. The passageway 34 thereof, which leads to the lower air chamber 33 is, however, connected to the air reservoir 8 by a connector pipe 23, from which the pipe 22 has been omitted and which therefore provides a single air passageway between reservoir 8 and passage 34 of device 24. The passageway 36 of the device 24 is connected by means of pipe line 137, directly to the magnetic brake-operating air engine 41, which is identical with the air engine 41, described in Figure 1, and operates in the same manner. When the solenoid 26 of the device 24 is energized, the armature and stem 27 is depressed, whereby air from the reservoir 8 passes through connector pipe 23, passageway 34 into lower air chamber 33 and thence into central air chamber 35 and then through pipe line 137 to cylinder 42 of air engine 41, whereby to overbalance the pressure of spring 46 on piston 43 and to thus move the brake 45 downwardly.

The vehicle of Figure 2 is equipped with an individual or auxiliary electrical train line comprising wires 111 and 112, terminating at one end in receptacle 116 and having their other ends adapted to be connected by relay means to a suitable source of power, as will be hereinafter described. The solenoid 26 of the device 24 is connected by means of wires 78 and 79 to the wires 112 and 111 of the auxiliary electric train line. The wire 78 is connected by means of wire 148 to one terminal of the coil of the brake magnets 47, which coils have the other terminal thereof connected by means of wire 149 to the wire 79. It is thus seen that, when the solenoid energizing circuit is completed, current will travel through wire 78 to solenoid 26 and from solenoid 26 back through wire 79, and at the same time current will travel from wire 78 through wire 148 to the coil of brake magnets 47 and from the coil back through wire 149 to wire 79. Thus, when the solenoid 26 is energized, the brake magnets are also energized whereby, upon the closing of a single circuit, the brakes are energized and applied. The means for completing the brake coil and solenoid energizing circuit comprises switch 160 having operating lever 161 thereon. The switch in the position shown in Figure 2, with the lever 161 on the line 0—0, is in a position to open the circuit between the respective branches of wire 78 and of wire 79. When the lever 161 is on the line 1—1 or advanced forty-five degrees, the circuit between the branches of 78 and 79 is still open and the operating conditions are unchanged from those existing with the lever 161 on the line 0—0. As hereinafter more clearly described, the position 0—0 of lever 161 occurs in the "release" position of valve 150 and the position 1—1 occurs in the "service application" position of valve 150. Due to the open condition of the circuit through wires 78 and 79 in these positions, the track brakes are deenergized. When the lever 161 is disposed on the line 2—2 of Figure 2, the circuit between the respective branches of wires 78 and 79 is closed. Thus, when the auxiliary train line comprising wires 111 and 112 is energized, the circuits between the respective branches of wires 78 and 79 may be completed by movement of the switch lever 161 (either manually or by occurrence of "emergency" position of valve 150) to a position coincident with the line 2—2 of Figure 2. When the lever is in this position, the solenoid and brake magnets are simultaneously energized. This causes the magnetic or track brakes to be energized and applied in the manner above described. It is to be understood that the means for operation of the air brake triple valve 150 and switch 160 in synchronism may be widely varied and that the disclosed means are merely illustrative and that we contemplate the use of any other desirable means or mechanism, the mechanism shown having been selected solely for the purpose of diagrammatic illustration. In Figure 6, we have shown means for energizing the individual or auxiliary electrical train line comprising wires 111 and 112, which means, generally designated 180, comprises prime mover 181 and generator 183 driven thereby through power connection 182, which generator has fields, generally designated 184, and which generator is suitably connected to a pair of relays 186 and 187 so that, upon the closing of the motorman's switch 185, preferably siitably located adjacent the motorman's valve 142, the relay solenoids 186 and 187 respectively will be energized to close the respective butt contacts 191 and 192, whereby to connect the wires 111 and 112 respectively in the power circuit of the generator 183. By this means, upon the closing of the motorman's switch 185, the electrical train line comprising wires 111 and 112 is energized or supplied with power. When the motorman's switch 185 is opened, the individual or auxiliary electrical train line, comprising wires 111 and 112, is "dead". The receptacle 116 of said train line is adapted to be connected by suitable jumper means to a corresponding receptacle on an adjacent car, which receptacle may, for instance, be either receptacle 63 or receptacle 116, shown in Figure 1 and described in the description thereof.

*Brake valve and switch-synchronizing means*
*(Figs. 2 to 4)*

We contemplate the use of synchronizing means adapted upon operation of the air brake valve 150 to so manipulate the switch 160 as to cause synchronized operations of the air brakes and magnetic track brakes. This may be accomplished by the provision of known electrical switch means on the valve 150, but, for the purpose of illustration, we have diagrammatically shown in Figures 3 and 4, mechanical means whereby numerous conditions of operation may be accomplished. By the means shown in Figures 2 and 3, the switch may be operated, as described below, by automatic or manual movement of the guide 221 of the valve 150 or by manipulation of the switch lever 161 manually, the track brakes may be energized and applied without the application of the air brakes solely by the completion of the circuits between the branches of wires 78 and 79 by the said manual manipulation of the switch lever 161. The means illustrated in Figures 2, 3 and 4 show one form of apparatus, whereby reciprocation of the valve slide guide 221 of triple valve 150 may cause energization and application of the magnetic track brakes, when the air brakes are applied by manipulation of the motorman's valve 142, manual operation of valve 150, manipulation of the conductor's valve 4 or of the track switch-operated valve 144. As shown in Figures 2 and 3, this means comprises the bell crank 170 having one arm pivotally attached to valve slide guide 221 and having attached to the other end thereof the link 171, which is also pivotally attached to one arm of the bell crank 172. The bell crank 172 has the other arm thereof pivotally attached to a pusher 173, which is suitably supported for reciprocation on a roller or the like 174. The pusher 173 has an abutment 175 at the end thereof, which is adapted to push the lever 161 to the right upon reciprocation of the pusher in the same direction as indicated by the arrow, due to the movement of the guide 221 to the right, as indicated by the arrow.

With reference particularly to Figure 2, it will be seen that, when the pressure in the air train line 1 is intact, the lever 161 is in position on the line 0—0 and the brake and solenoid energizing circuits are open, whereby the track brakes are deenergized and released and the air brakes are also released. Upon "service application" of the air brakes by reduction in pressure in the air line 1, the valve guide 221, due to its attachment to the slide of triple valve 150, moves to the right a distance sufficient to cause the pusher 173 to move the switch lever 161 to the line 1—1 (see Fig. 3). The brake energizing circuit will still remain open, whereby the solenoid of valve 24 and the coils of the magnetic brakes are de-energized and the magnetic track brakes are released. The air brakes are, however, set.

Upon an "emergency" air brake application, the reduction of pressure in air line 1 is sufficient to cause the valve guide 221 to move further to the right whereby switch arm 161 is moved to position on the line 2—2, closing the circuit energizing solenoid 26 and track brake magnets (see Fig. 4). The air brakes are set. When the lever reaches line 2—2, the circuit is closed for energizing the solenoid 26 and track brakes, whereby the magnetic track brakes are energized and applied.

When, as shown in Figure 3, the pressure in the line 1, is reduced by "service" air brake application, valve guide 221 is moved to the right and the lever 161 is positioned on the line 1—1. The circuit through the switch 160 is open in this position of the switch whereby to prevent energization of the solenoid 26 and the brake magnets to energize and apply the magnetic brakes. Thus, upon "service" air brake application, the track brakes are still deenergized and inoperative.

Upon "emergency" air brake application which causes a greater reduction of the pressure in the air line 1, the valve guide 221 moves further to the right, as shown in Figure 4, and the switch lever takes a position on the line 2—2 and the circuit through switch 160 is closed. The magnetic track brakes are energized and applied.

Also in Figure 2, we have diagrammatically illustrated an air brake system, which comprises generally the air brake cylinder C and linkage L, having air brake shoes S on the respective members thereof, and we have also indicated the position of the magnetic track brakes 45 between the wheels W of the vehicle. The track rail is indicated at R.

It is understood that the above description is merely illustrative and in no wise limiting and that we desire to comprehend within our invention such modifications as may be embraced within the claims and the scope of our invention.

Having thus fully described our invention, what we claim as new and desire to secure by Letters Patent, is:

1. A magnetic track brake system for a vehicle having air brakes, an air brake train line and a valve for applying said air brakes, said track brake system comprising magnetic brake shoes, means for energizing said shoes, means for applying said shoes, means for manually varying the intensity of energization of said shoes during energization, and a single electro-responsive means for causing simultaneous operation of said track brake energizing means and said track brake applying means.

2. A magnetic track brake system for a vehicle having air brakes, an air brake train line and a valve for applying said air brakes, said track brake system comprising magnetic brake shoes, means for energizing said shoes, means for applying said shoes, and a single means for causing simultaneous operation of said track brake energizing means and said track brake applying means, said single means comprising an electro-responsive valve made operative by decrease of pressure in said air brake train line.

3. A magnetic track brake system for a vehicle having air brakes, an air brake train line and a valve for applying said air brakes, said track brake system comprising electromagnetic brake shoes, means for energizing said shoes, means for applying said shoes, and means for causing simultaneous operation of said track brake energizing means and said track brake applying means and for manually selectively varying the intensity of the energization thereof during application.

4. In an electrical circuit for a railway magnetic track brake system, a main electrical train line extending from car to car of a train, an auxiliary train line on one car of the train, means to selectively connect said train lines and manually operable means to selectively adapt the power delivery of one train line for use with the magnetic brake energizing and operating mechanisms in the other train line.

5. In electromagnetic train brake means, a normally energized main electric train line for providing normal brake energizing power, an auxiliary electric train line, a local power source, means for manually connecting said auxiliary train line to said main train line for energization therefrom, and means operable upon energization of said auxiliary train line to disconnect said local power source from said auxiliary train line and operable upon de-energization of said train lines to connect said local power source with said auxiliary train line for providing emergency brake energizing power.

6. In electromagnetic train brake means, a normally energized main electric train line extending throughout the train for providing normal brake energizing power, an auxiliary electric train line, local power sources on the vehicles of the train, manual means for connecting said auxiliary train line to said main train line for energization therefrom, and means made operative through energization of said auxiliary train line to disconnect said local power sources from said auxiliary train line and automatically operative upon de-energization of said main train line to connect said local power sources with said auxiliary train line for providing emergency brake energizing power through said main train line.

7. In control means for electromagnetic track brakes, a main electric train line providing normal brake energizing power, an auxiliary electric train line for providing emergency brake energizing power, local vehicle power sources, means for energizing said auxiliary train line by connection with said main train line, and means responsive to energization of said auxiliary train line from said main train line for automatically isolating said local power sources from said auxiliary train line during energization of said auxiliary train line by connection thereof with said main train line.

8. In control means for the electromagnetic track brakes of a train comprising connected railway vehicles, a main electric train line coextensive with the train for providing normal brake energizing power, an auxiliary electric train line coextensive with the train for providing emergency brake energizing power, local power sources on the train vehicles, means for energizing said auxiliary train line from said main train line, and means responsive to energization of said auxiliary train line from said main train line for isolating said local power sources from said auxiliary train line and responsive to de-energization of said main train line and the connected auxiliary train line for automatically connecting said local power sources to said auxiliary train line to provide emergency brake energizing power through said auxiliary train line and the connected main train line.

9. A magnetic track brake system for a vehicle having air brakes, an air brake train line and a valve adapted upon decrease of pressure in said train line to apply the air brakes, said track brake system comprising electromagnetic track brakes, means for energizing said track brakes, means for applying said track brakes and means for causing said track brake energizing means and said track brake applying means to operate simultaneously, said last-named means being adapted to be operated by said air brake applying valve to cause operation of said air brakes and said track brakes in sequence.

10. In a track brake system for a vehicle having air brakes and means to apply said air brakes, electromagnetic track brakes, means to energize said track brakes, means to apply said track brakes, and electrical means, including an electro-pneumatic valve device, adapted to selectively adjust the intensity of energization of said track brakes and to cause operation of said track brakes and said air brakes in sequence.

11. In a track brake system for a vehicle having air brakes and means to apply said air brakes, electromagnetic track brakes, means to energize said track brakes, means to apply said track brakes, and a single electrical means adapted to cause operation of said track brakes and said air brakes in sequence.

12. In a track brake system for a vehicle having air brakes and means to apply said air brakes, electromagnetic track brakes, means to energize said track brakes, means to apply said track brakes, and electrical means adapted to cause operation of said track brakes and said air brakes in sequence.

13. In a track brake system for a vehicle having air brakes and means to apply said air brakes, electromagnetic track brakes, means to energize said track brakes, means to apply said track brakes, selective means for varying the intensity of energization of said track brakes, and electrical means adapted to cause operation of said track brakes and said air brakes in sequence, said electrical means including an electro-pneumatic valve device.

14. In a track brake system for a vehicle having air brakes and means to apply said air brakes, electromagnetic track brakes, means to energize said track brakes, means to apply said track brakes, and electrical means adapted to cause operation of said track brake energizing and applying means simultaneously upon application of said air brakes, said electrical means comprising a manually operable electrical controller adapted to be selectively operated to vary the intensity of energization of said track brakes.

15. In a track brake system for a vehicle having air brakes and means to apply said air brakes, electromagnetic track brakes, means to energize said track brakes, means to apply said track brakes, and electrical means adapted to cause operation of said track brakes and said air brakes in sequence, said electrical means comprising a manually operable switch.

16. In a track brake system for a vehicle having air brakes and means to apply said air brakes, electromagnetic track brakes, means to energize said track brakes, means to apply said track brakes, and electrical means adapted to cause operation of said track brakes and said air brakes in sequence, said electrical means comprising a manually operable controller.

17. In a track brake system for a vehicle having air brakes and means to apply said air brakes, electromagnetic track brakes, means to energize said track brakes, means to apply said track brakes, and electrical means adapted to cause operation of said track brakes and said air brakes in sequence, said electrical means comprising a manually operable switch.

18. In a track brake system for a vehicle having air brakes and means to apply said air brakes, electromagnetic track brakes, means to energize said track brakes, means to apply said track brakes, and electrical means adapted to cause operation of said track brakes and said air brakes in sequence, said electrical means comprising a manually operable controller.

19. In an electromagnetic track brake system for a rail vehicle having an air train line, air brakes, and a valve adapted to operate upon decrease of pressure in said train line to apply said air brakes; electromagnetic track brakes, an energizing circuit therefor, means comprising an air engine adapted to apply said brakes to a track rail, and electrical means adapted to cause said brake applying means and said brake energizing means to operate to energize and apply said track brakes, said electrical means being so synchronized with said air brake applying means as to cause the track brakes to be energized and applied in sequence with an application of said air brakes by operation of said air brake applying valve.

20. In an electromagnetic track brake system for a rail vehicle having an air train line, air brakes, and a valve adapted to operate upon decrease of pressure in said train line to apply said air brakes; electromagnetic track brakes, an energizing circuit therefor, means comprising an air engine adapted to apply said brakes to a track rail, and electrical means adapted to cause said brake applying means and said brake energizing means to operate to energize and apply said track brakes, said electrical means being so synchronized with said air brake applying means as to cause the track brakes to be energized and applied at a predetermined interval before application of said air brakes by operation of said air brake applying valve.

21. In a track brake system for a track vehicle having air brakes; electromagnetic track brakes, manually operable electrical controller means to energize and apply said track brakes, said manually operable electrical controller means being adapted for selective operation to vary the intensity of energization of said brakes.

22. In a track brake system for a vehicle, electromagnetic brakes, air engine means for positioning said brakes, an electrical circuit for energizing said brakes, means adapted to be selectively operated independently of the brake positioning means to vary the intensity of energization of said brakes, common electromagnetic means adapted, upon actuation, to simultaneously close said electrical circuit and cause operation of said air engine, whereby to energize and apply said brake.

23. A track brake system for a vehicle having an air brake train line and an electrical train line, said system comprising an electromagnetic brake, means for applying said brake, means for energizing said brake, and electrical means for operating said energizing and positioning means, said last-named means including a mechanism whereby the intensity of energization of said brake may be selectively manually controlled.

24. In an electromagnetic track brake system for a rail vehicle including a magnetic brake having an electric brake magnet energizing circuit, an air engine for positioning said brake and an electro-pneumatic device for causing operation of said air engine, said electro-pneumatic device having an operating solenoid and a circuit for energizing said solenoid; means comprising a manually operable controller having a rheostat therein and connected to said solenoid energizing circuit and said brake magnet energizing circuit, whereby the intensity of the energizing circuits may be simultaneously controlled by operation of the controller in order to vary the intensity of energization and application of the brake.

25. In a air brake system for positioning an electromagnetic brake comprising an air train line, an air engine, an air conduit connected thereto at one end, a slide valve attached to the other end of said conduit, a second conduit connected to said valve, an air reservoir connected to said second conduit for communication with said valve, said valve being adapted upon reduction of pressure in said air train line to connect the air reservoir through said conduits to said air engine whereby to operate said engine; means comprising a connection including a check valve and disposed between said reservoir and said air train line for preserving the pressure in the air reservoir upon loss of pressure in said air train line and for keeping the pressure in said reservoir equal to or greater than the pressure in said air train line.

26. In a magnetic track brake system including an electromagnetic brake, an air train line, an air reservoir connected thereto, a brake-positioning air engine adapted to be automatically connected to said reservoir, an electro-pneumatic device for connecting said reservoir with said air engine, an energizing circuit for said electro-pneumatic device, and an energizing circuit for said brake and manual controller means connected in said circuits whereby said brake may be energized and positioned automatically upon the fall of pressure in said air train line or selectively by energization of said circuits.

THEODORE H. SCHOEPF.
DAVID M. RITCHIE.